United States Patent [19]

Takazawa

[11] 3,943,292

[45] Mar. 9, 1976

[54] AUTOMATIC TELEPHONE ANSWERING APPARATUS

[75] Inventor: Makoto Takazawa, Yokohama, Japan

[73] Assignee: Sony Corporation, Tokyo, Japan

[22] Filed: Sept. 9, 1974

[21] Appl. No.: 504,563

[30] Foreign Application Priority Data

Sept. 22, 1973 Japan.............................. 48-107233

[52] U.S. Cl............................................... 179/6 R
[51] Int. Cl.².......................................... H04M 1/64
[58] Field of Search .......................... 179/6 R, 6 AC

[56] References Cited
UNITED STATES PATENTS

| | | | |
|---|---|---|---|
| 3,426,152 | 2/1969 | O'Halloran et al. ................ | 179/6 R |
| 3,492,427 | 1/1970 | Foster ................................ | 179/6 AC |
| 3,539,728 | 11/1970 | Rubenstein ......................... | 179/6 R |
| 3,728,487 | 4/1973 | Hata................................... | 179/6 R |

*Primary Examiner*—Vincent P. Canney
*Attorney, Agent, or Firm*—Hill, Gross, Simpson, Van Santen, Steadman, Chiara & Simpson

[57] ABSTRACT

An automatic telephone answering device which uses magnetic recording and reproducing apparatus and in which a pair of magnetic heads are spaced a distance apart relative to a magnetic tape, such that when an incoming call is received, the first magnetic head picks up the recorded message on the tape and transmits it to the caller while simultaneously the recorded message picked up by the first head is transmitted to the second magnetic head, such that the recorded message as well as a pair of control signals before and ahead of the recorded message are again recorded on the tape at the second head. The caller records his message on the tape in the blank portion between the instructions to the caller and the control signals and second instructions to the caller. The control signals stop the machine after the incoming message has been recorded.

12 Claims, 8 Drawing Figures

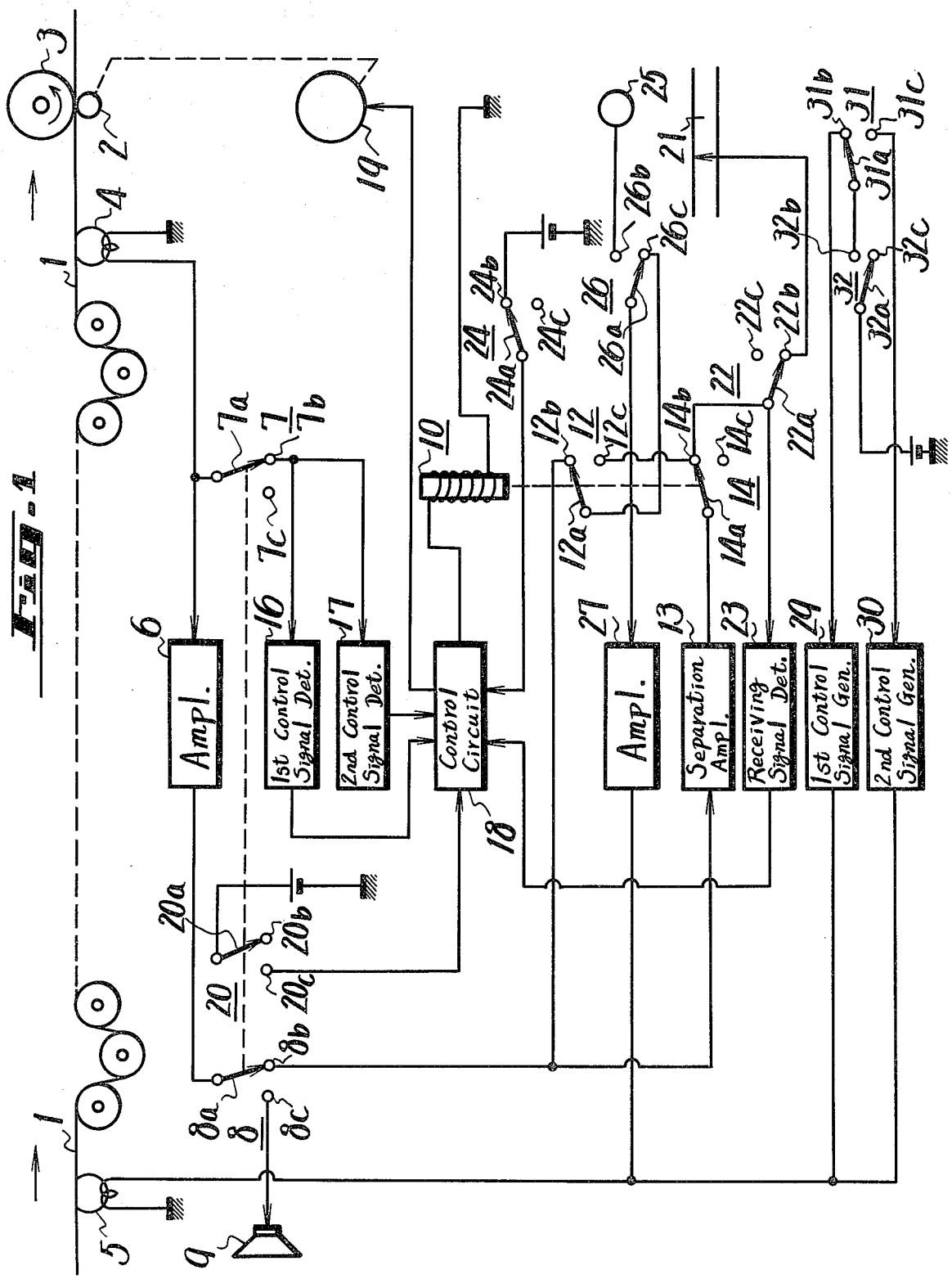

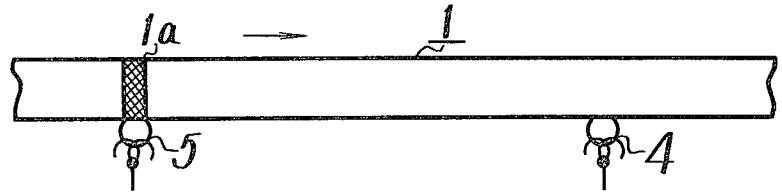
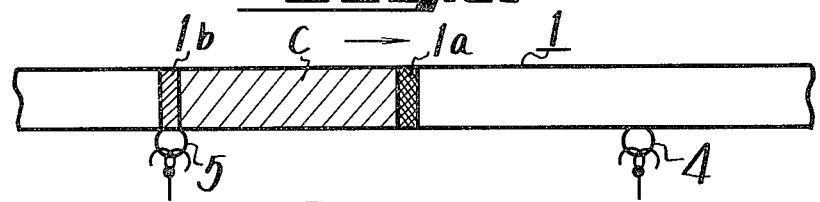
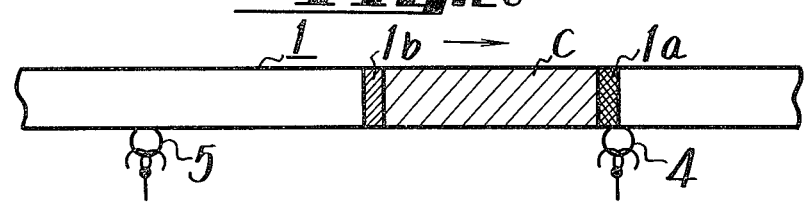
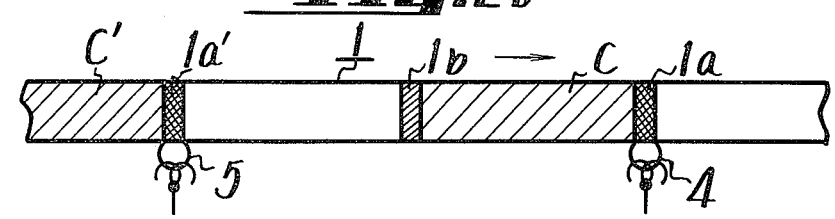
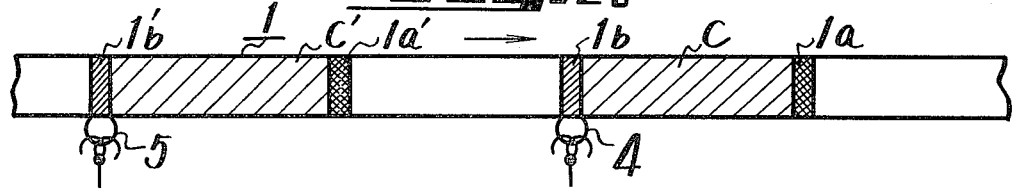
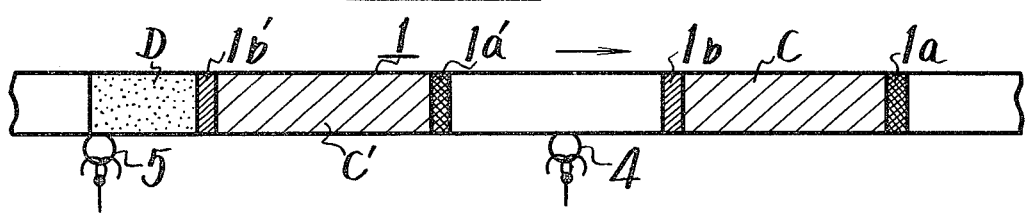
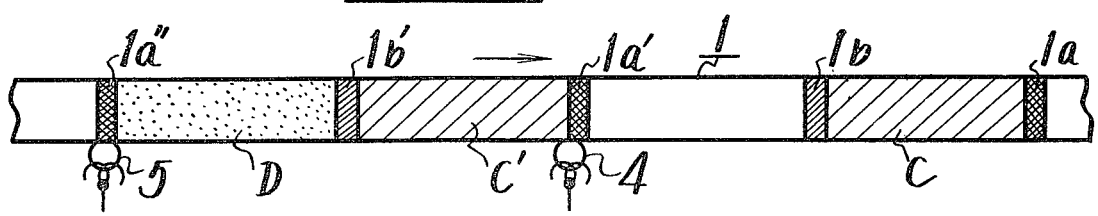

AUTOMATIC TELEPHONE ANSWERING APPARATUS

BACKGROUND OF THE INVENTION

1. Field of the Invention

The present invention relates in general to magnetic recording and reproducing apparatus for automatic telephone answering devices which allow unattended telephones to indicate to an incoming caller that the telephone subscriber is absent and then instructs the caller that he can leave a recorded message which will be given to the subscriber when he returns.

2. Description of the Prior Art

Numerous automatic telephone answering devices have been provided in which a recorded instruction to incoming callers is recorded on an endless magnetic tape and the incoming caller then records a message. With such prior art devices, two driving mechanisms have been employed for driving the magnetic tapes and such apparatus is complicated and expensive and is relatively large.

SUMMARY OF THE INVENTION

The present invention relates to an automatic telephone answering device which includes magnetic recording and reproducing apparatus wherein a pair of magnetic heads are mounted relative to a magnetic tape and are spaced a predetermined distance apart. The first magnetic head reproduces instructions to an incoming caller when the telephone rings and tells him to give a message during a predetermined time interval. The second magnetic head reproduces the start and stop control signals as well as the recorded answering message which is reproduced by the first magnetic head such that the control tones serve as a stop signal to prepare the machine for the second incoming call.

It is thus an object of the present invention to provide a magnetic tape recorder for an automatic telephone answering device which is free from the drawbacks of the prior art.

It is a further object of the present invention to provide a magnetic tape recorder for automatic telephone answering machines which is simple and inexpensive.

It is another object of the present invention to provide a tape recorder for an automatic telephone answering machine in which the instructions to the incoming caller are repeatedly recorded on a single magnetic tape and in which messages from different callers are recorded between adjacent recorded instructions.

Other objects, features and advantages of the presenet invention will become apparent from the following description when taken in conjunction with the accompanying drawings.

BRIEF DESCRIPTION OF THE DRAWINGS

FIG. 1 is a schematic diagram illustrating an embodiment of the magnetic tape recorder for an automatic telephone answering device according to the present invention; and FIGS. 2A through 2G illustrate the pair of magnetic heads and the tape with the various message formats illustrated thereon.

DESCRIPTION OF THE PREFERRED EMBODIMENT

The automatic telephone answering device of the present invention is illustrated in FIG. 1. Generally the machine utilizes a magnetic tape 1 and a pair of magnetic heads 4 and 5 which are spaced a distance apart along the tape 1 as it moves thereby and initially a first answering instruction message is recorded by the subscriber on the tape 1 by using the recording head 5. This message includes a first control tone, then the instruction message to the incoming caller, and then a second control tone, and such recorded instruction and control tones move from the head 5 until the first control tone is detected by the magnetic head 4 which stops the machine. Then the machine is set for an incoming call. When an incoming call is received, the tape is started, and the recorded control tone passes the head 4 and the recorded message on the tape is fed back to the incoming caller to inform him that the subscriber is absent and that he can leave a message on the tape machine. Simultaneously, the message recorded on the tape 1 is supplied from the magnetic head 4 to the magnetic head 5 so that the start control tone, the recorded message for an incoming caller, and the second control tone will be recorded a second time on the tape 1, such that after the incoming caller has recorded his message on the tape 1, the control tone recorded by the head 5 will again stop the machine so that it is set for the next incoming call. The results is that there will be recorded on the tape 1 the recorded instructions for the incoming caller with the first and second control tones on opposite sides of this message and between each of such recorded instruction messages will appear the recorded incoming calls from the different calls that have been received during the subscriber's absence. Of course, the subscriber, when he returns, can then play back the tape and receive the messages which have been left for him.

In FIG. 1, the capstan 2 engages the tape 1 and the other side of the tape is pressed against the capstan by a pinch roller 3 such that when the capstan 2 is driven by a motor 19, the tape will be driven to the right relative to FIG. 1, past the magnetic heads 4 and 5, which are separated a predetermined distance apart. The first magnetic head 4 is a reproducing magnetic head which reads signals recorded on the magnetic tape 1 and supplies them to an amplifier 6 and to a movable contact 7a of a switch 7, which has stationery contacts 7b and 7c, as shown. The output of amplifier 6 is supplied to the movable contact 8a of a switch 8 which has stationery contacts 8b and 8c, as shown. A speaker 9 is connected to switch contact 8c. Switch contact 7b is connected to inputs of a first control signal detector 16 and to the input of a second control signal detector 17. A control circuit 18 receives the output of the first control signal detector 16 and the second control signal detector 17. A switch 20 has its movable contact 20a connected to one side of a voltage source, as for example, a battery, which has its opposite terminal connected to ground. The switch 20 has fixed contacts comprising an open circuit contact 20b and a second contact 20c, which is connected to the input of control circuit 18 to supply the voltage from the voltage source to the control circuit 18 when the switch contact 20c engages the movable contact 20a of switch 20. A switch 24 has a movable contact 24a movable between fixed contacts 24b and 24c. Contact 24c is an open circuit contact and contact 24b is connected to one terminal of a voltage source which has its opposite side connected to ground. Movable contact 24a supplies an input to the control circuit 18. The control circuit 18 is connected to the drive motor 19 so as to turn it on and off in response to incoming received signals.

Fixed contact 8b of switch 8 is connected to the input of a separation amplifier 13 as well as to a first fixed contact 12b of a change-over switch 12. The switch 12 has a movable contact 12a movable between fixed contact 12b and fixed contact 12c. Movable contact 12a is connected to a fixed contact 26c of a switch 26 which has its movable contact 26a connected to the input of an amplifier 27. Fixed contact 26b of switch 26 is connected to a microphone 25. The output of amplifier 27 is connected to recording head 5 as shown. A second change-over switch 14 has its movable contact connected to the output of separation amplifier 13. Fixed contact 14b of switch 14 is connected to fixed contact 12c of switch 12 and to movable contact 22a of a changeover switch 22. Movable contact 22a of switch 22 is connected to the input of receiving signal detector 23 which supplies an output to the control circuit 18. Contact 22c of switch 22 is an open circuit and contact 22b of switch 22 is connected to the telephone lines of the subscriber so as to receive incoming messages and to supply outgoing messages thereto.

The movable contacts 12a and 14a of switches 12 and 14 are controlled by a magnetic relay 10 which has one side grounded and its other side is connected to an output of the control circuit 18.

A first control signal generator 29 has its output connected to the magnetic head 5 and produces a low frequency signal as, for example, 40 Hz, which provides a first control signal on the magnetic tape 1. A second control signal generator 30 has its output connected to magnetic head 5 and produces a low frequency output, as for example, 20 Hz, which is the second control signal. The first and second control signals are recorded at the start and end of the recorded answer message. A switch 31 has its movable contact connected to the fixed contact 32b of a switch 32. The movable contact 32a of switch 32 is connected to one side of a battery which has its other side connected to ground. Contact 32c of switch 32 is an open circuit contact. Fixed contact 31c of switch 31 is connected to the second control signal generator 30. Contact 31b is connected to generator 29.

The first control signal generator 29 and the second control signal generator 30 are constructed such that they produce control signals for a time interval of 1 to 2 seconds and thereafter stop the production of the control signals automatically.

The separation amplifier 13 is constructed such that a vocal signal of a calling person will not be recorded when a control signal from the first or reproducing magnetic head 4 is being recorded on the magnetic tape 1 by the second recording head 5.

The first control signal detecting circuit 16 produces an output signal when it detects a control signal as, for example, 40 Hz recorded on the magnetic tape 1 at the start of a recorded answer, while the second control detecting circuit 17 produces an output signal when it detects a control signal of, for example, 20 Hz recorded on the magnetic tape at the end of the answer recording. The control circuit 18 is constructed such that a signal from the telephone circuit 21 is detected by the receiving signal detecting circuit 23 and then the detecting circuit 23 produces a detecting signal which is applied to the control circuit 18 and the control circuit supplies electrical power to the motor 19 to cause it to operate. The control circuit is so constructed such that a signal from the first control signal detecting circuit 16 which occurs within a predetermined interval of time after the received signal from the telephone circuit 21 will not be applied to the control circuit 18 to stop the motor 19. When a signal is fed to the control circuit 18 from the second control signal detecting circuit 17, the magnetic relay 10 will be supplied with electrical power from the control circuit 18 and will be energized. The electro-magnetic relay device 10 is operative only when it receives a signal from the control circuit 18, and at that time moves switch contacts 12a and 14a of the switches 12 and 14. When no signal is applied to the relay 10, the movable contacts 12a and 14a return to engage contacts 12b and 14b, respectively, whereas when the relay 10 is energized, movable contacts 12a engages fixed contact 12c and movable contact 14a engages fixed contact 14c.

When it is desired to play back the information recorded on the tape 1, through the loudspeaker 9, movable contact 20a is moved to connect the power source to contact 20c which energizes the control circuit 18 so that the motor 19 is energized to move the tape 1 past the reproducing head 4 which produces an output to the amplifier 6 which is fed through movable contact 8a to the speaker 9. It should be realized that the switches 7, 8 and 20 are ganged together so that the movable contacts 8a, 7a and 20a move together.

In order to record a message on the tape 1 so that incoming calls will be given such message, the movable contact 7a of switch 7 is connected to its first fixed contact 7b and the movable contact 22a of switch 22 is connected to its second fixed contact 22c, the movable contact 24a of switch 24 is connected to its first fixed contact 24b, and movable contact 26a of switch 26 is connected to its first fixed contact 26b, respectively. Also, the movable contact switch 31a of switch 31 is connected to its first fixed contact 31b. Under such conditions, the driving motor 19 will be energized to re-rotate the capstan 2 and drive the magnetic tape to the right relative to FIG. 1. The movable contact 32a of the power source switch 32 is connected to its first fixed contact 32b to supply electrical power to the first control signal generating circuit 29 and the circuit 29 produces a low frequency control signal of 40Hz, which is then recorded by the recording magnetic head 5 on the magnetic tape 1 at its beginning portion as a first control signal for a predetermined interval of time as shown in FIG. 2A and indicated as 1a in this Figure. Then the message to be recorded and given to an incoming caller designated by C is recorded by the head 5 through the microphone 25 on the tape.

After the recording of the instructions C on the magnetic tape, the movable contact 26a of switch 26 is connected to its second fixed contact 26c and the movable contact 31a of switch 31 is connected to its second fixed contact 31c which causes the second control signal generator circuit 30 to be energized with electrical power and it produces a low frequency control signal of 20 Hz which is recorded by the second magnetic head on the magnetic tape 1 at a location 1b immediately after the answer instructions C. The signal 1b is a second control signal and lasts for a predetermined interval of time as shown in FIG. 2B. Thus, the recording process of the instructions to the incoming caller is completed. At a subsequent time, the magnetic tape 1 is transported forward, and the first control signal 1a recorded on the magnetic tape 1 will be reproduced by the reproducing magnetic head 4, as shown in FIG. 2C. The reproduced signal by the first magnetic head 4 is applied to the input side of the reproducing amplifier 6, and to the input side of the first control signal detecting circuit 16 which then detects the first control signal 1a and applies the same to the control circuit 18. This causes the electrical power source to the driving motor 19 to be cut off by the control circuit 18 which stops the motor 19 and stops the movement of the magnetic tape 1. Thus, the apparatus is in a condition to stand by for accepting incoming telephone calls.

When the machine is used as an automatic telephone answering device for giving a message to incoming calls and in which the incoming caller can leave a recorded message, the movable contact 22a of switch 22 is moved to engage its first fixed contact 22b and movable contact 32a of the power source switch 32 is connected to its second fixed contact 32c. The electro-magnetic relay 10 does not receive electrical power under these conditions, and thus the movable contacts 12a and 14a of the switches 12 and 14 will be connected to their first fixed contacts 12b and 14b, respectively, as shown in FIG. 1.

When an incoming call occurs, a signal will be applied from the telephone circuit 21 to the receiving signal detecting circuit 23 through the switch 22 and the receiving signal detecting circuit 23 produces an output which is applied to the control circuit 18, which then supplies an output signal to the driving motor 19 to drive the tape 1. Thus the capstan 2 will be rotated and the magnetic tape will be transported. At the same time, the magnetic head 4 will reproduce the first control signal 1a which has a frequency of 40 Hz, which has been recorded on the magnetic tape, and will apply the reproduced control signal to the reproduction amplifier 6 and to the first control signal detecting circuit 16. The reproduced control signal 1a of 40 Hz is applied through the amplifier 6, the switches 8, 12 and 26 to the amplifier 27 and then to the recording magnetic head 5, where it is again recorded on the magnetic tape 1 as signal 1a', as illustrated in FIG. 2D. During this time, the first control signal 1a from the first control signal detecting circuit 16 is not applied to the control circuit 18 for a predetermined interval of time after the receiving signal is detected, so that the magnetic tape continues to be transported.

Then the answering instructions C will be reproduced by the first magnetic head 4 and applied to 6. The reproduced answer signal C from the amplifier 6 is applied through switch 8 to the separation amplifier 13 and then through switches 14 and 22 to the telephone circuit 21, wherein the instructions C are supplied as an answer to the incoming caller. Simultaneously, the reproduced answer instruction signal C is applied from the amplifier 6 to the amplifier 27 through switches 8, 12 and 26 and the amplifier 27 applies the signal C to the second head 5, where it is again recorded on the magnetic tape as indicated by C', as shown in FIGS. 2D and 2E.

After the recorded message C has been reproduced by the head 4, the second control signal 1b of 20 Hz is reproduced by the first magnetic head 4 as shown in FIG. 2E and this signal is applied to the second control signal detecting circuit 17 and also to the second magnetic head 5 through amplifier 6 and switches 8, 12 and 26, and through amplifier 27 to head 5 so as to be recorded as the second control signal 1b', as shown in FIG. 2E. The detected second control signal 1b detected by the second control signal detecting circuit 17 is applied to the control circuit 18 which controls the magnetic relay 10 and causes it to be energized. Thus, the magnetic relay 10 is energized, which changes the movable contacts 12a and 14a of the switches 12 and 14 so that they respectively engage fixed contacts 12c and 14c.

Then an incoming call on telephone circuit 21 will be applied to the amplifier 27 through switches 22, 14, 12 and 26 and then will be applied to the recording magnetic head 5 so that the incoming message will be recorded on the magnetic tape 1 in the blank portion D of the magnetic tape, as illustrated in FIG. 2F.

When the vocal signal D has been recorded by magnetic head 5, then the tape portion 1a' of magnetic tape 1 comprising the first control signal 1a' of 40 Hz will be transported to the position corresponding with the first magnetic head 4 and will be reproduced by the head 4 as shown in FIG. 2G. The reproduced control signal 1a' will be applied to the first control signal detecting circuit 16 which applies the detected control signal 1a' to the control circuit 18 and the control circuit 18 disconnects the electrical power to the motor 19 which stops the transport of the magnetic tape 1 and simultaneously the relay 10 will be de-energized. This causes the movable contacts 12a and 14a of switches 12 and 14 to move to engage fixed contacts 12b and 14b, respectively, which releases the received signal holding state from the telephone circuit 21 and the apparatus is then in a stand-by condition until the next call is received.

When the next telephone call is received, a signal from the telephone circuit 21 will be applied to the receiving signal detecting circuit 23 and the operation discussed above will be sequentially repeated. The first reproducing magnetic head 4 reproduces the instruction program C' instead of the answer signal C and the control signal 1a' of 40 Hz is reproduced instead of signal 1a of 40Hz, and is applied to the first control signal detecting circuit 16. Also, as an answer to the incoming call, the reproduced answer instruction C' will be supplied to the telephone circuit 21. At the same time, the reproduced instruction program C' will be fed through the amplifier 27 to the second recording magnetic head 5 to be again recorded on the magnetic tape to form a reproduced answer instruction signal C''.

When the person returns to his home or office and wishes to reproduce the messages that have been recorded on the magnetic tape during his absence, he moves contact 7a of switch 7 so it engages fixed contact 7c and moves switch contact 8a which is ganged with contact 7a so that contact 8a engages contact 8c. Movable contact 20a is also ganged with switch contacts 7a and 8a and moves to engage contact 20c.

The magnetic tape 1 is rewound so that the starting position of the portion D of the magnetic tape 1 on which the incoming calling person's message is recorded or the portion of the magnetic tape 1 adjacent to the second control signal 1b' is adjacent the first magnetic head 4. As the magnetic tape 1 is transported to the right relative to FIG. 1, the first magnetic head 4 will reproduce the incoming calling person's vocal signal which will be applied to the amplifier 6 and from the amplifier 6, the signal will be supplied to the speaker 9 through the switch 8 where it can be listened to. The magnetic tape may be driven past the head 4 so as to sequentially reproduce the incoming calls in the order in which they were received.

A fast forward mechanism may be provided in the machine by driving the motor 19 and the capstan 2 fast so that the instruction portions C, C' etc. in which the instructions to the incoming caller are given, are transported rapidly and the incoming message portions, D, D', etc. on the magnetic tape can be transported at normal speeds and listened to.

In the present invention, the instructions to the incoming caller and the incoming caller's message will be repeated sequentially and only one magnetic tape is necessary for recording the instructions to the incoming caller as well as to record his message.

Also, with the present invention, when the instructions recorded on the magnetic tape 1 is supplied to the person making the incoming call, the instructions reproduced by the reproducing magnetic head 4 will simultaneously be applied to the person making the incoming call through the telephone circuit 21 as well as to the recording magnetic head 5 where the instructions will be again recorded on the same magnetic tape. This eliminates the need for a reproducing device as required for endless magnetic tape machines of the prior art. Thus, the automatic telephone answering apparatus of the invention is simple in construction, and its handling is convenient, and it can be inexpensively manufactured and is trouble free.

Also in the present invention, the length of the magnetic tape between the first and second magnetic heads 4 and 5 is selected such that the time interval required for the instructions to the calling person (the portion C) and the calling person's message (the portion D) is such that even if a number of persons telephone, the messages will be recorded on a single magnetic tape in sequential order and will be in the order in which the calls were received.

In the present invention, only a single instruction need be recorded on the magnetic tape, but the instruction will be repeatedly recorded on the magnetic tape sequentially at the proper positions. Thus, there is no need to provide a magnetic tape on which instructions are repeatedly recorded.

Although the invention has been described with respect to preferred embodiments, it is not to be so limited as changes and modifications may be made therein which are within the full intended scope of the invention, as defined by the appended claims.

I claim as my invention:

1. A magnetic recording and/or reproducing apparatus for an automatic telephone answering device comprising:
    a. a single track magnetic tape with instruction programs recorded thereon within a first predetermined distance portion of said tape;
    b. means for driving said magnetic tape;
    c. first and second magnetic heads mounted adjacent said single track magnetic tape and spaced a predetermined distance apart;
    d. switching means for changing signal transmission paths between said first and second magnetic heads; and
    e. means for controlling said magnetic tape driving means and said changing means, whereby said first magnetic head reproduces said instruction programs and supplies the reproduced instruction program signal to a telephone circuit and also to said second magnetic head to be recorded on said single track magnetic tape within a part of a second predetermined distance portion of said tape, and an incoming message signal from said telephone circuit recorded by said second magnetic head on said single track magnetic tape on a portion thereof.

2. An automatic telephone answering device for telephone lines comprising, a single track magnetic tape with recorded instructions to an incoming caller and a pair of different control signals recorded thereon with the first and second control signals being on opposite ends of said recorded instructions, a read head mounted so as to read information on said single track magnetic tape, a write head mounted a predetermined distance along said single track tape behind said read head, a driving means for driving said tape pass said read and write heads, a control circuit connected to said driving means and said read head, a received signal detecting circuit connected to said control circuit and to telephone lines to cause said control circuit to energize said driving means when an incoming call is received, and switching means controlled by said control circuit so as to supply said recorded instructions to said telephone lines and said first and second control signals and said recorded instructions to said write head such that second instructions and control signals are recorded on said single track tape longitudinally spaced from the first recorded instructions and control signals, and such that a message from said incoming call can be recorded on said single tape after said second control signal.

3. An automatic telephone answering device for telephone lines according to claim 2 wherein the space on said tape between heads is such that said message may have a predetermined length.

4. An automatic telephone answering device for telephone lines according to claim 2 including a first control signal detector connected between said read head and said control circuit.

5. An automatie telephone answering device for telephone lines according to claim 4 including a second control signal detector connected between said read head and said control circuit.

6. An automatic telephone answering device for telephone lines according to claim 5 wherein said switching means further includes a relay controlled by said control circuit so as to be energized when said second control signal passes said read head, and first and second switches controlled by said relay such that said first switch disconnects said read head from said write head and said second switch connects said write head to said incoming telephone lines.

7. An automatic telephone answering device according to claim 6 including a first control signal generator connected to said write head to record a first control signal of a first frequency signal.

8. An automatic telephone answering device according to claim 7 including a second control signal generator connected to said write head to record a second frequency signal.

9. An automatic telephone answering device according to claim 8 including manual switch means for selectively energizing said first and second control signal generators.

10. An automatic telephone answering device according to claim 2 including a microphone and means for connecting said microphone to said write head so as to record instructions on said tape.

11. An automatic telephone answering device according to claim 2 including audio reproducing means connected to said read head.

12. An automatic telephone answering device according to claim 2 including means for selectively connecting a power source to said control circuit.

* * * * *